(12) United States Patent
Tucek

(10) Patent No.: US 10,810,093 B1
(45) Date of Patent: Oct. 20, 2020

(54) INITIALIZING NODE RELIABILITY FOR LEADERSHIP ELECTION

(71) Applicant: Amazon Technologies, Inc., Seattle, WA (US)

(72) Inventor: Joseph Andrew Tucek, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 15/891,261

(22) Filed: Feb. 7, 2018

(51) Int. Cl.
*G06F 11/00* (2006.01)
*G06F 11/14* (2006.01)
*H04L 12/24* (2006.01)
*G06F 11/34* (2006.01)
*H04L 29/08* (2006.01)

(52) U.S. Cl.
CPC ...... *G06F 11/1471* (2013.01); *G06F 11/1464* (2013.01); *G06F 11/3409* (2013.01); *H04L 41/0663* (2013.01); *H04L 41/0806* (2013.01); *H04L 41/30* (2013.01); *H04L 67/1034* (2013.01)

(58) Field of Classification Search
CPC .............. G06F 11/1471; G06F 11/1464; G06F 11/3409
See application file for complete search history.

(56) References Cited

U.S. PATENT DOCUMENTS

| | | | | |
|---|---|---|---|---|
| 5,365,463 | A | * | 11/1994 | Donath ............... G06F 11/3457 703/13 |
| 9,311,073 | B2 | | 4/2016 | Hotham et al. |
| 9,690,675 | B2 | * | 6/2017 | Madduri ............. G06F 11/2005 |
| 2005/0086273 | A1 | * | 4/2005 | Loebbert ............... H04W 84/20 |
| 2008/0071853 | A1 | | 3/2008 | Mosier et al. |
| 2012/0166390 | A1 | * | 6/2012 | Merriman ........... G06F 11/1458 707/613 |

* cited by examiner

*Primary Examiner* — Katherine Lin
(74) *Attorney, Agent, or Firm* — Robert C. Kowert; Kowert, Hood, Munyon, Rankin & Goetzel, P.C.

(57) ABSTRACT

A distributed system implements initializing reliability data of a newly joined node of a cluster for purposes of leadership election. When a new node joins a cluster, the new node receives reliability data for one or more existing nodes of a cluster. The new node initializes its own reliability data based on the reliability data received from the existing nodes of the cluster. In some cases, the new node may calculate a median reliability of the existing nodes and then initialize its own reliability to be the median or slightly below the median. For example, if the median reliability is "two failures," then the new node may set its reliability to be "three failures." This may provide a more stable leadership election process, as the new nodes are unlikely to be elected as a leader node.

20 Claims, 8 Drawing Sheets

Elect new leader based on reliability data

INITIALIZING NODE RELIABILITY FOR LEADERSHIP ELECTION

BACKGROUND

Distributed systems are often used to implement distributed applications using multiple servers. For example, provider networks may offer remote data storage services that are implemented across multiple storage nodes in order to provide high availability and to facilitate scaling by adding new storage nodes. When implementing a distributed service on a cluster of nodes, one or more of the nodes may serve as a leader node that performs certain tasks (e.g., receiving service requests from clients and farming out tasks to non-leader nodes). When a leader node fails, a distributed systems may perform a leadership election process in order to elect a candidate node to replace the failed leader node. However, the distributed system may have little or no information regarding the suitability of a particular candidate node to serve as a leader node if the particular candidate node recently joined as a new member of the cluster.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement initializing reliability data of a newly-joined node (a "new node") of a cluster ("group" of nodes) for purposes of leadership election and updating the initialized reliability data of the new node. In some embodiments, the initializing and/or updating of the reliability data of the new node may be performed by the new node itself. In embodiments, the initializing and/or updating of the reliability data of the new node may be performed by a cluster manager that manages the nodes of the cluster. In various embodiments, the leadership election process may be performed by the nodes of the cluster and/or by a cluster manager that manages the nodes of the cluster.

In embodiments, a new node may receive reliability data for one or more existing nodes of a cluster of a distributed system. The reliability data for the existing nodes may include data that indicates one or more measurements of reliability for the respective nodes of the cluster. For example, the reliability data for a given node may indicate how many times the node has failed and/or has been accused of failing by another node or by a cluster manager (e.g., due to not receiving any response from the given node for a threshold period of time after sending a request). In various embodiments described herein, the number of times a node has failed may be substituted for the number of times a node has been "accused" of failing, and vice versa.

In embodiments, some or all of the reliability data may be tracked by a node itself. For example, a node may monitor its own performance and/or failures and store that as its own reliability data or to modify and/or update its own reliability (e.g., after the reliability data has been initialized).

In some embodiments, the new node may initialize the reliability data for itself based on the reliability data received from the existing nodes of the cluster. The reliability data for the new node may include data that indicates one or more measurements of reliability for the new node. In embodiments, the new node may vote for one or more nodes of the cluster to be the leader node based at least in part on the reliability data for the new node and the reliability data for the existing nodes of the cluster.

In various embodiments, a cluster manager separate from the cluster may perform some or all of the above functions instead of the new node and/or existing nodes themselves. For example, a cluster manager may receive reliability data for one or more existing nodes of a cluster of a distributed system. The reliability data for the existing nodes may include indicate one or more measurements of reliability for the respective nodes of the cluster.

In embodiments, the cluster manager may then initialize the reliability data for the new node based on the reliability data received from the existing nodes of the cluster. The reliability data for the new node may include indicate one or more measurements of reliability for the new node. In embodiments, the cluster manager may elect one or more nodes of the cluster to be the leader node based at least in part on the reliability data for the new node and the reliability data for the existing nodes of the cluster.

In some embodiments, particular nodes are assigned (e.g., through election) to be leader roles with respect to at least some types of client requests. For example, a data storage service may implement a cluster of nodes in which one or more leader nodes accept client requests to write and/or read data. In embodiments, a "leader" may refer to a role assigned to a node of a cluster, indicating that the node is responsible for orchestrating responses to one or more categories of service requirements (e.g., writing data to a database service). A distributed service may include multiple concurrent and often autonomous nodes, communicating with one another and/or with shared resources across one or more networks. In some embodiments, decisions as to how (e.g., by which nodes of a cluster) a particular service request is to be fulfilled may be made by a leader node that receives the request. After the request fulfillment decision is made, a leader node may issue commands or requests to other (non-leader) nodes to implement the lower-level operations required (e.g., lower-level write requests or read requests).

In various embodiments, nodes and the network paths between the nodes of a cluster that implements a distributed system or service may experience failures (or apparent failures, in which it may appear that a node is not available even though it remains operational). Thus, a cluster manger (or nodes themselves) may store a number of failures and/or a number of accused failures for some or all of the nodes of the cluster. In embodiments, some or all of the nodes may be capable of implementing the responsibilities of being a leader. If the current leader fails or becomes inaccessible, a replacement leader may be appointed according to an election process based on reliability, as described in more detail below. In various embodiments, electing a node to be a leader node may be performed by a cluster manager which is implemented separately from the nodes of the cluster, e.g., at one or more computing devices linked to one or more nodes of the cluster via a network. In other embodiments, the nodes of the cluster themselves may elect a leader based on voting (e.g., by a majority vote).

In embodiments, after a cluster manager elects a node to be a leader node, the cluster manager and/or nodes may propagate data indicating the newly-elected leader node to some or all the reachable nodes of the distributed service. In embodiments in which the nodes elect a leader, the nodes themselves may propagate the data indicating the newly-elected leader node to each other until some or all of the nodes have the data. In various embodiments, a work request transmitted by a leader node to a non-leader node may include a leadership indicator, which enables the recipient non-leader node to recognize that the work request was sent by the leader and should therefore be fulfilled.

By initializing reliability data of a new node of a cluster based on reliability data for existing nodes of the cluster and electing a leader node based on the initialized reliability data for the new node and the reliability data for existing nodes, the stability of a distributed system may be increased compared to traditional techniques for implementing leadership election. For example, leader nodes will be less likely to fail because new nodes will not be elected or are less likely to be elected as leader shortly after joining the cluster. Using traditional techniques, a new node might be elected as a leader because little or no data is available regarding the reliability of the new node. For example, a new node may be elected because the performance history of the new node indicates zero failures, even though the actual reliability of the new node may be worse than other candidate leader nodes when measured over a longer period of time.

Traditional techniques for leadership election, new nodes are more likely to be elected to be leader nodes when an old leader node fails. By electing a new node as a leader node, traditional techniques for leadership election result in higher turnover of leader nodes due to failure of the new node as a leader node. Higher turnover results in a more unstable cluster and causes performance of the cluster and/or the distributed service to be reduced. The techniques for more stable leadership election based on initialized reliability data described herein allow for lower turnover of leadership nodes, reducing the time it takes for a cluster and/or the distributed service to recover from leader node failures. By reducing the recovery time for failures, the distributed system and/or service may suffer a short period of latency or a latency spike instead of a longer period of unavailability as seen with traditional techniques.

Figure 1:
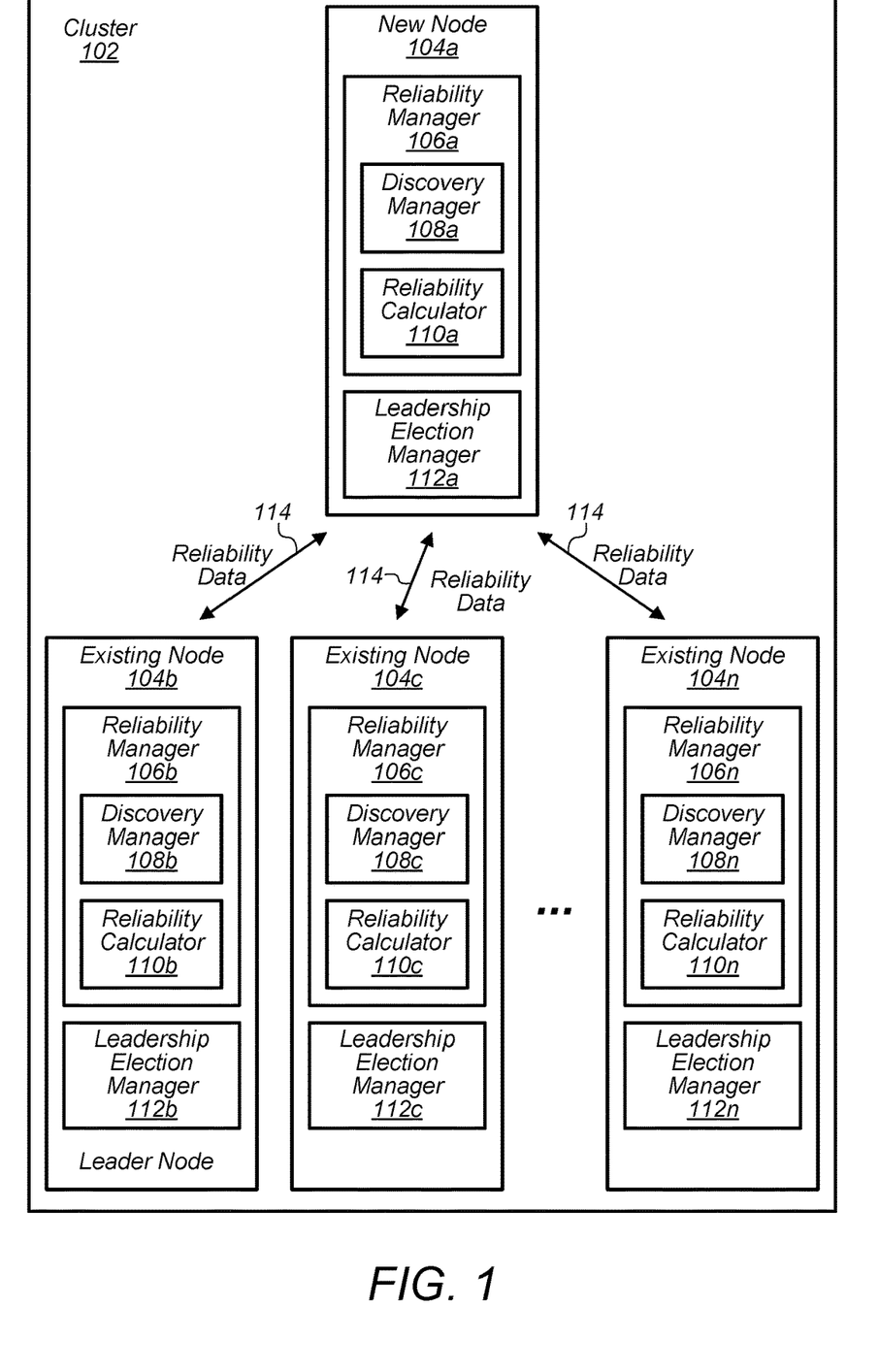
FIG. 1 illustrates a system for initializing reliability data of a newly joined node of a cluster for purposes of leadership election and using nodes of the cluster to track reliability data, according to some embodiments.

FIG. 1 illustrates a system for initializing reliability data of a newly joined node of a cluster for purposes of leadership election and using nodes of the cluster to track reliability data, according to some embodiments. The devices depicted in FIG. 1 may be the same type of device, and include some or all of the same components as other devices depicted in FIGS. 1-3B, in embodiments. Although certain components of a cluster and/or a cluster manager are described as performing various actions, any of the actions described as performed by a cluster and/or a cluster manager may be performed by any hardware and/or software component of the cluster, the cluster manger, or any other components of FIGS. 1-3B.

In the depicted embodiment, a cluster 102 includes a group of nodes 104 that may communicate with each other and perform one or more functions. In embodiments, the nodes 104 may be data storage nodes for a distributed data storage service. One or more nodes of the cluster may receive write and/or read requests from a client of the service and in response, perform write and/or read operations or send instructions to one or more other nodes 104 to perform write and/or read operations.

In embodiments, a new node 104a may join the cluster 102. As shown, the cluster 102 already has a number of existing nodes 104b-104n when the new node 104a joins. In some embodiments, by adding the new node 104a to the cluster, the cluster may scale to serve a larger number of clients, process or store a larger volume of data, increase a speed of a distributed service running on the cluster 102, and/or to increase fault tolerance of the cluster.

In the example embodiment, the nodes 104 include a reliability manager 106, which includes a discovery manager 108 and a reliability calculator 110. As shown, the nodes also include a leadership election manager 112.

In an embodiment, when the new node 104a joins the cluster 102, the discovery manager 108a discovers one or more existing nodes 104 of the cluster. For example, the discovery manager 108a may send an announcement to one or more of the existing nodes 104 indicating that the new node is joining the cluster 102. A discovery manager 108 of one or more existing nodes may receive the announcement and respond with a message to indicate its presence to the new node 104a. For example, the discovery manager 108b of the existing node 104b may send a message back to the new node 104.

In some embodiments, in response to receiving the announcement from the new node, an existing node may send reliability data 114 for one or more of the nodes back to the new node 104a. For example, the reliability manager 108b may send reliability data 114a from the existing node 104b to the new node 104a. In embodiments, the reliability data 114*a* may include reliability data for the existing node 104*b* and/or one or more other existing nodes 104.

Although the illustrated embodiment shows three existing nodes 104 sending reliability data 114 to the new node, any other number of existing nodes 104 may send reliability data 114 to the new node in response to the new node 104*a* joining the cluster 102. Moreover, in embodiments, reliability data 114 for one or more existing nodes that is sent from a particular existing node 114 may have more or less recent reliability data than that of another node. For example, existing node 104*b* may send reliability data to the new node that indicates a level of reliability for existing node 104*c*, but existing node 104*n* may send reliability data to the new node that indicates a more recently updated level of reliability for existing node 104*c*. Thus, in some embodiments, the new node 104*a* may select the most recent reliability that it receives for the existing nodes, regardless of which existing node actually provided it.

In embodiments, the reliability data 114 that the new node 104*a* receives indicates one or more measurements of reliability for respective existing nodes. The reliability data for a given existing node may indicate a number of times the given existing node has been accused of failing (e.g., within a threshold period of time from the current time or since a particular time). For example the reliability data for node 104*b* may indicate that node 104*b* has been accused of failing twice in the last 24 hours or twice since Monday at 12 pm. In embodiments, the reliability data may include a timestamp indicating when it was last updated and/or verified.

In some embodiments, the reliability calculator 110*a* initializes its reliability data for the new node 104*a* based on the reliability data for one or more existing nodes of the group. Thus, the reliability data for the new node may indicate one or more measurements of reliability for the new node, even though the actual node reliability of the new node has not yet been measured based on performance. For example, as described in more detail below, the reliability data for the new node 104*a* may be initialized as three failures (or accused of failing three times), even though the new node 104*a* has not actually failed since it recently joined the cluster 102.

In embodiments, the leadership election manager 112 may vote for one or more of the nodes 104 to be a leader node based at least in part on the initialized reliability data for the new node 104*a* and/or the reliability data 114 received from existing nodes 114. For example, when existing node 104*b* fails as a leader node, the new node 104*a* may vote for existing node 104*c* to be the new leader node if the reliability calculator 110*a* calculates the reliability of the existing node 104*c* to be higher than the new node 104*a* itself and higher than that of any other existing nodes 104 that are candidates to be a leader.

In some embodiments, all of the existing nodes and the new node are candidates to be a leader node. In various embodiments, one or more nodes may be removed from being eligible candidates, at least for a period of time, based on performance being below a threshold performance. For example, if the existing node 104*c* has been accused of failing more than twice in the last 24 hours, then it may be removed from being a candidate leader node. If it failure rate lowers to be twice or less within a 24 hours period, then it may be added back to the pool of candidate nodes.

In embodiments, at one or more times after the new node joins the cluster, the new node may collect and/or measure one or more performance metrics for the new node and update (e.g., using the reliability calculator) the initialized reliability data for the new node based at least on the performance metrics for the new node. For example, the new node may measure a number of failures of the new node over a period of time and update the reliability data for the new node based on the initialized reliability data and the measured number of failures over the period of time. Therefore, the initialized reliability data for the new node may be replaced, over time, by actual measured performance of the new node (e.g., based on applying more weight to the actual measured performance than the initialized reliability data). In some embodiments, some or all of the reliability data for a new node may be initialized based on the type of hardware and/or software (e.g., configuration) of a new node. For example, different reliability data may be initialized (e.g., different number of failures) for different types of hard disks and/or operating software.

In embodiments, the new node may assign a weight to the initialized reliability data (e.g., a number of failures of the new node) and assign another weight to the measured number of failures over the period of time. The new node may then calculate a new number of failures by adding the weighted initialized reliability data and the weighted measured number of failures. In embodiments, the updating may be performed on a periodic basis.

Figure 2:
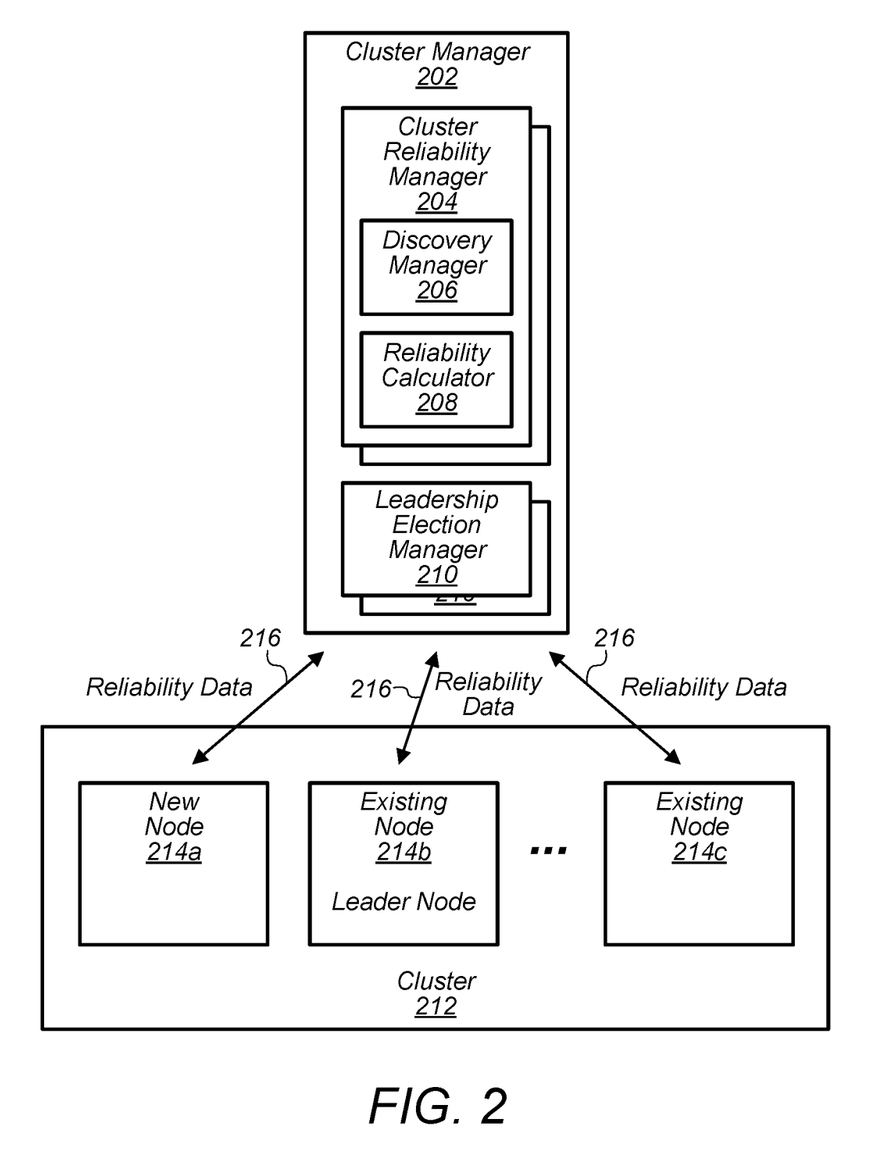
FIG. 2 illustrates a system for initializing reliability data of a newly joined node of a cluster for purposes of leadership election and using a cluster manager to track reliability data, according to some embodiments.

FIG. 2 illustrates a system for initializing reliability data of a newly joined node of a cluster for purposes of leadership election and using a cluster manager to track reliability data, according to some embodiments. As shown, a cluster manager 202 may include a cluster reliability manager 204, which includes a discovery manager 206 and a reliability calculator 208. The cluster manager 202 also includes a leadership election manager 210.

In embodiments, the cluster manager may include backup instances and/or nodes that to implement one or more components that can take over in case a component fails. For example, there may be one or more cluster reliability managers running as backup instances and/or nodes and there may be one or more leadership election managers running as backup instances and/or nodes. Thus, if a cluster reliability manager or a leadership election manager fails, the backup may take over with little or no interruption to operation of the distributed system.

In the illustrated embodiment, the cluster manager 202 communicates with a cluster 212 of nodes 214. As described above, the cluster manager may be a centralized manager separate from the cluster 212. Thus, the cluster manager may include one or more nodes other than the nodes 214 of the cluster 212. In embodiments, the cluster 212 may include any number of existing nodes 214 and a new node 214*a* that recently joined the cluster 212.

In embodiments, any of the components of the cluster manager may perform the same and/or similar functions as described for the corresponding components of FIG. 1. For example, for each of the nodes 214 of the cluster, the discovery manager 206 and the reliability calculator 208 may perform the same and/or similar functions described for the discovery manager 108 and the reliability calculator 110 of FIG. 1. Thus, the cluster manager 202 may perform some or all of the corresponding functions instead of the nodes themselves, as was described in FIG. 1.

In an embodiment, the cluster manager 202 may receive the reliability data 216 for nodes 214 from one or more of the nodes 214 of the cluster 212. For example, the reliability data may be sent to the cluster manager 202 as heartbeat messages or as messages indicating a health status of the node. The cluster manger 202 may store the reliability data for the existing nodes. In some embodiments, the nodes may also or instead keep track of and store the reliability data themselves.

In some embodiments, the reliability calculator may receive data 216 from one or more of the nodes 214 and calculate reliability for each of the nodes 214 based on the received data 216 and/or timing of the received data 216. For example, if a heartbeat message has not been received from one of the nodes 214 for more than a threshold period of time, the reliability manager may increase a count for the number of times the node 214 has been accused of failing or failed.

In some embodiments, the discovery manager 206 may discover that a new node 214a has joined the group. For example, the discovery manager 206 may receive an announcement from the new node 214a, similar to FIG. 1. In embodiments, the reliability calculator 208 may then initialize the reliability data for the new node 214a based on the received node reliability data for the existing nodes of the group. In some embodiments, the cluster reliability manager 204 and/or the reliability calculator 208 may keep track of the reliability data for all of the nodes 214 of the cluster 212.

In an embodiment, the leadership election manager 210 may elect one or more nodes 214 of the cluster 212 based at least in part on the reliability data for the new node 214a and the reliability data for the existing nodes 214 of the group. In embodiments, when a leader node fails, the leadership election manager 210 may elect a particular node 214 to be a leader in response to calculating or identifying that the reliability data for the particular node 214 indicates that it is the most reliable node 214 out of the existing candidate nodes 214. For example, the leadership election manager 210 may identify that the particular node 214 has been accused of failing the least number of time out of the existing candidate nodes 214.

In embodiments, at one or more times after the new node joins the cluster, the cluster manager may collect and/or measure one or more performance metrics for the new node and update (e.g., using the reliability calculator) the initialized reliability data for the new node based at least on the performance metrics for the new node. For example, the cluster manager may measure a number of failures of the new node over a period of time and update the reliability data for the new node based on the initialized reliability data and the measured number of failures over the period of time. Therefore, the initialized reliability data for the new node may be replaced, over time, by actual measured performance of the new node.

In embodiments, the cluster manager may assign a weight to the initialized reliability data (e.g., a number of failures of the new node) and assign another weight to the measured number of failures over the period of time. The cluster manager may then calculate a new number of failures by adding the weighted initialized reliability data and the weighted measured number of failures. In embodiments, the updating may be performed on a periodic basis.

Figure 3A:
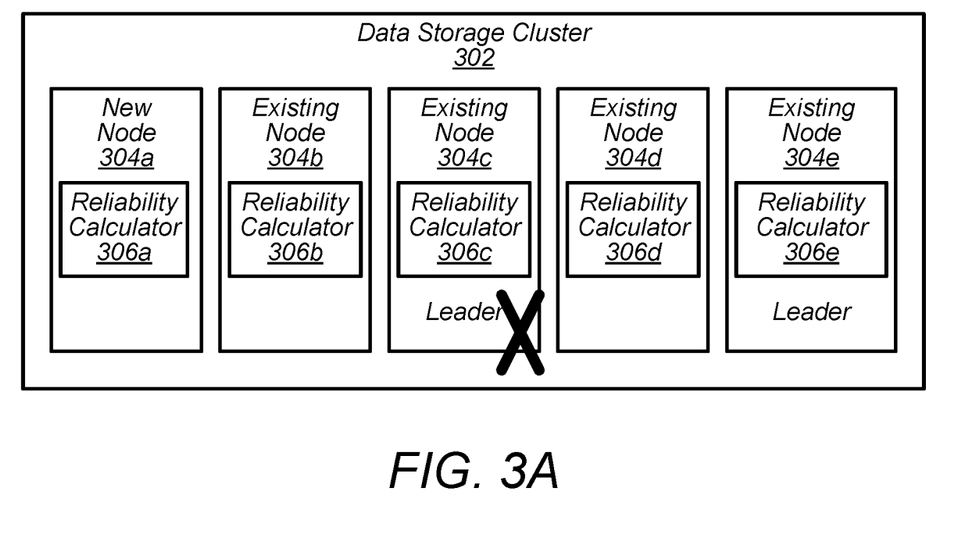
FIG. 3A illustrates a data storage cluster in which a new node joins the cluster and then one of two leader nodes fails, according to some embodiments.

FIG. 3A illustrates a data storage cluster in which a new node joins the cluster and then one of two leader nodes fails, according to some embodiments. As shown, a data storage service may implement a data storage cluster 302 to store data across five nodes 304. In embodiments, the data storage service by be offered by a provider network to one or more remote client devices. Thus, the data storage cluster 302 may be within the provider network and store data for a remote client network located in another physical location (e.g., another cite or state). In some embodiments, each node 304 may include a separate hardware storage device for storing data (e.g., a hard disk or other memory storage device).

In embodiments, the data storage cluster 302 is a replica group of storage nodes. Thus, each of the nodes 304 may store a replica of a data object. In some embodiments, the one or more leader nodes (e.g., existing node 304c and/or existing node 304e) perform writes to the data object and the non-leader nodes (e.g., nodes 304a, 306b, and 306d) perform read operations to the data object. In embodiments, the non-leader nodes do not have permission to write to the data object.

In the depicted example, the new node 304a joins the data storage cluster. As described above, the new node 304a may initialize the reliability data for the new node (e.g., using the reliability calculator 306a) based on reliability data for the other existing nodes 304b-304e of the data storage cluster. As described above, in some embodiments, a cluster manager may instead initialize the reliability data for the new node based on reliability data for the other existing nodes 304b-304e. At some time after the new node 304a joins the data storage cluster, the leader node 304c fails.

Figure 3B:
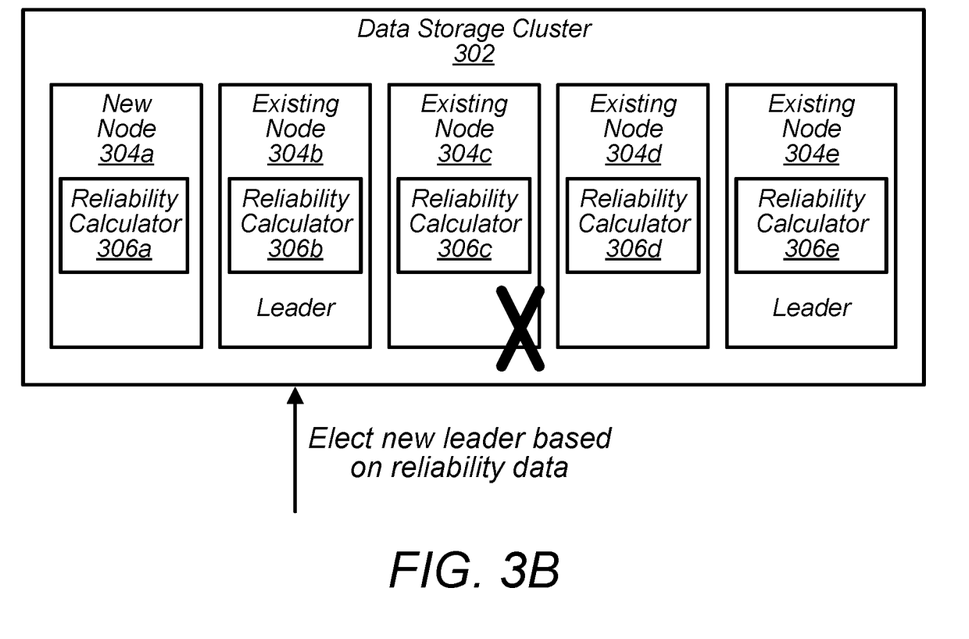
FIG. 3B illustrates a process for electing a leader node for a data storage cluster based on reliability data for the newly joined node and reliability data for existing nodes, according to some embodiments.

FIG. 3B illustrates a process for electing a leader node for a data storage cluster based on reliability data for the newly joined node and reliability data for existing nodes, according to some embodiments.

In embodiments, in response to failure of the old leader node 304c, a node leader 3034b is elected based on reliability data for the new node 304a and the remaining existing nodes. As discussed above, in embodiments, some or all of the nodes 304 may vote for a new leader node 304b. The new node 304 and the remaining existing nodes may vote for a new leader node based on the initialized reliability data of the new node 304a and the reliability data for the remaining existing nodes as calculated by each node. In embodiments, a majority vote may be required to elect a leader. In some embodiments, a unanimous vote may be required. In various embodiments, any suitable voting technique may be used to elect a leader.

As discussed above, in some embodiments, a cluster manager may instead elect the leader 304b based on the initialized reliability data of the new node 304a and the reliability data for the remaining existing nodes. In embodiments, upon joining the data storage cluster 302, the number of times that the new node 304a has been accused of failing is calculated to be higher than the likelihood for a number of times that existing nodes of the cluster have been accused of failing. For example, if the likelihood for a number of times existing nodes of the cluster has been accused of failing is "two," then the number of times that the new node has been accused of failing may be calculated as "three." This will prevent a newly joined node from being elected to be a leader node (at least initially or within a short time period of joining the cluster). As discussed above, this may provide for a more stable leader election process (less turnover of leader nodes), resulting in better performance for the data storage service. In some embodiments, the number of times that a new node (e.g., new node 304a) has been accused of failing is calculated to be lower than (or equal to) the likelihood for a number of times that existing nodes of the cluster have been accused of failing.

In embodiments, a likelihood for a number of times that existing nodes have been accused of failing may be an average of the number of times that existing nodes have been accused of failing, a median of the number of times that existing nodes have been accused of failing, a mean of the number of times that existing nodes have been accused of failing, a geometric mean of the number of times that existing nodes have been accused of failing, an average of the number of times that existing nodes have been accused of failing rounded up (or down) to the nearest whole number, or any other number derived from the reliability data of the existing nodes that represents a most likely number of times that a given node of the existing nodes has been accused of failing.

Figure 4:
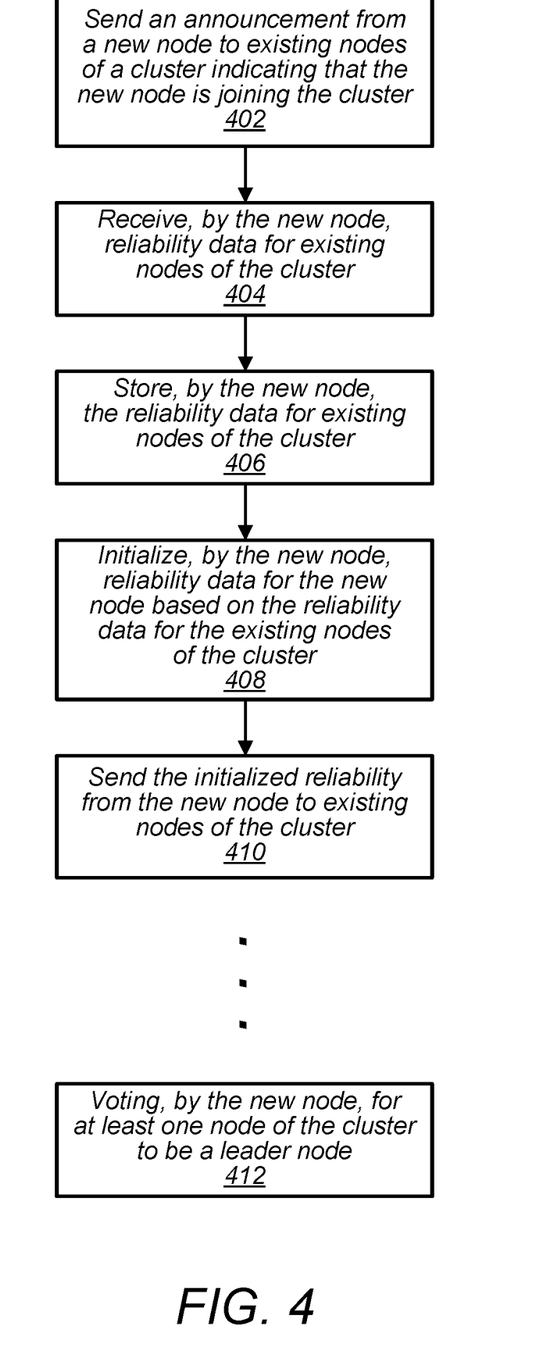
FIG. 4 is a flow diagram illustrating a newly-joined node initializing reliability data for itself and sending the initialized reliability data to existing nodes, according to some embodiments.

FIG. 4 is a flow diagram illustrating a newly-joined node initializing reliability data for itself and sending the initialized reliability data to existing nodes, according to some embodiments. In various embodiments, one or more portions of the illustrated processes of FIGS. 4-8 may be performed via any of one or more devices, components, or services of a cluster and/or a cluster manager.

At block 402, a new node may send an announcement message to one or more existing nodes of a cluster. The message may indicate that the new node is joining or has joined the cluster as a member node and/or as a candidate to be a leader node. At block 404, the new node receives reliability data for one or more existing nodes of the cluster.

At block 406, the new node stores the received reliability data for the existing nodes. At block 408, the new node initializes reliability data for the new node (for itself) based on the reliability data received from the one or more existing nodes of the cluster. At block 410, the new node sends the initialized reliability data to one or more existing nodes of the cluster.

At a later point in time (block 412), a failure of a leader node or other event may occur that indicates the need for an election to elect a new leader. In response, the new node votes for one or more nodes of the cluster to be a leader node based at least in part on the initialized reliability of the new node and/or the reliability data received from the one or more existing nodes.

Figure 5:
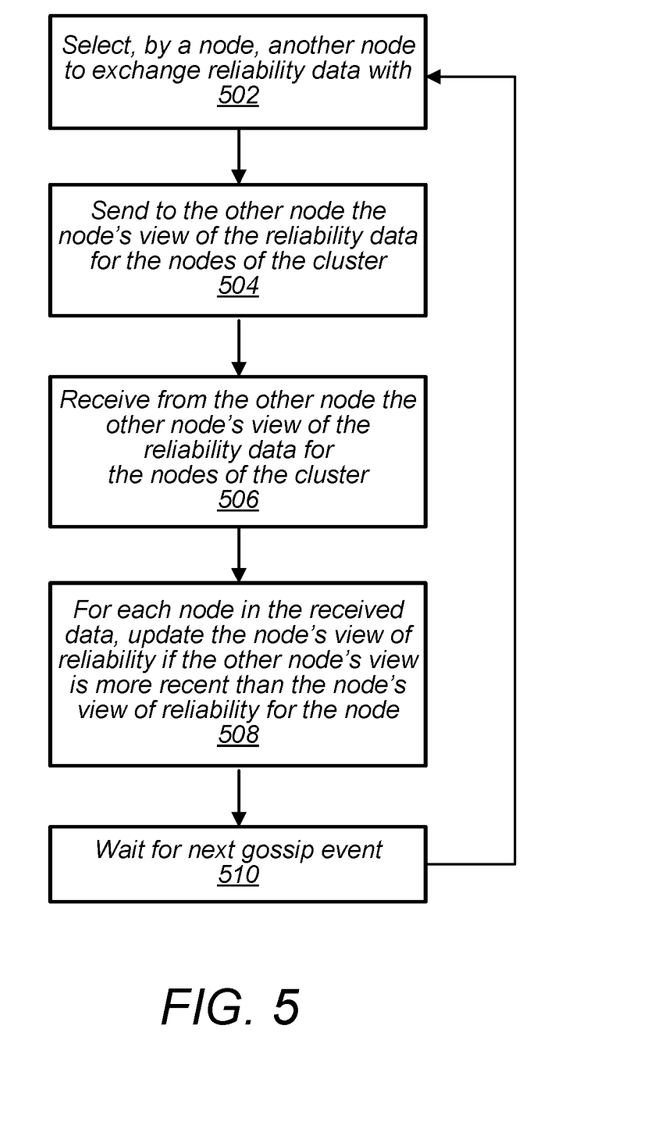
FIG. 5 is a flow diagram illustrating two nodes using a gossip protocol to update their view of node reliability for nodes of a cluster, according to some embodiments.

FIG. 5 is a flow diagram illustrating two nodes using a gossip protocol to update their view of node reliability for nodes of a cluster, according to some embodiments.

At block 502, a node selects another node to exchange reliability data with. In embodiments, each of the nodes may store its own current view of reliability data of some or all of the nodes of the cluster. In some embodiments, one of the nodes may have more recently updated reliability data for some nodes of the cluster, while the other node may have more recently updated reliability data for other nodes.

At block 504, the node sends to the other node the node's view of the reliability data for the nodes of the cluster. At block 506, the node receives from the other node the other node's view of the reliability data for the nodes of the cluster. At block 508, for each particular node in the received reliability data, the node updates the node's own view of the reliability data of the particular node if the other node's view is more recent than the node's view of reliability data for the particular node. At block 510, the node waits for a next gossip event, which will trigger another exchange of data with a node of the cluster.

Figure 6:
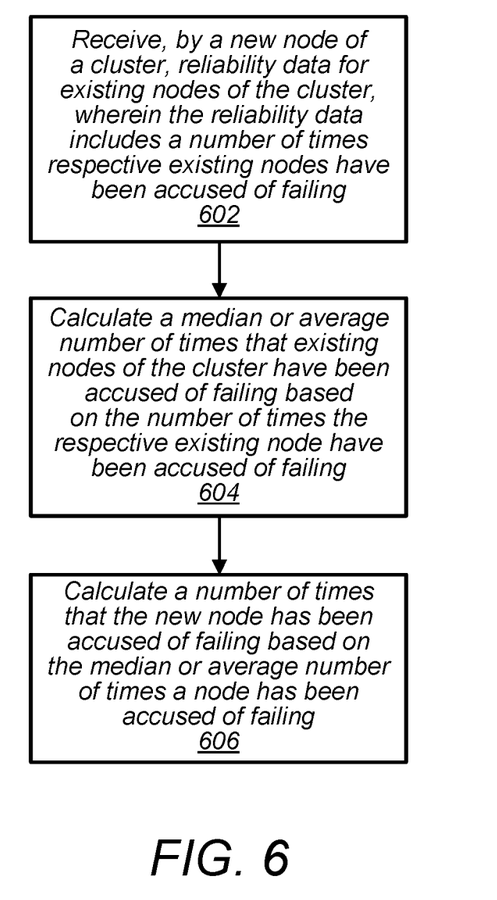
FIG. 6 is a flow diagram illustrating a newly-joined node initializing reliability data for itself by calculating a likelihood for a number of times that existing nodes of a cluster have been accused of failing, according to some embodiments.

FIG. 6 is a flow diagram illustrating a newly-joined node initializing reliability data for itself by calculating a likelihood for a number of times that existing nodes of a cluster have been accused of failing, according to some embodiments. Although the depicted example describes calculating a median or average number of times that existing nodes have been accused of failing, any other suitable calculation based on the reliability data of the existing nodes may be used to determine a likelihood for a number of times that existing nodes of a cluster have been accused of failing, as discussed above.

At block 602, the new node receives reliability data for one or more existing nodes of the cluster. In embodiments, the reliability data may include a number of times that respective existing nodes have been accused of failing. At block 604, the new node calculates a median (or average) number of times that existing nodes of the cluster have been accused of failing based on the number of times that the respective existing nodes have been accused of failing. As discussed above, in embodiments, the new node calculates a likelihood for a number of times that existing nodes of the cluster have been accused of failing based on the number of times that the respective existing nodes have been accused of failing.

At block 604, the new node calculates the number of times that the new node has failed or has been accused of failing based on the calculated median (or average) (e.g., likelihood for a) number of times that existing nodes of the cluster have been accused of failing. For example, the new node may simply assign the calculated number of times to itself. In embodiments, the new node may calculate a value worse than the median value. For example, if the median reliability is "two failures," then the new node may set its reliability to be "three failures." In some embodiments, the new node may calculate a value equal to or better than the median value.

Figure 7:
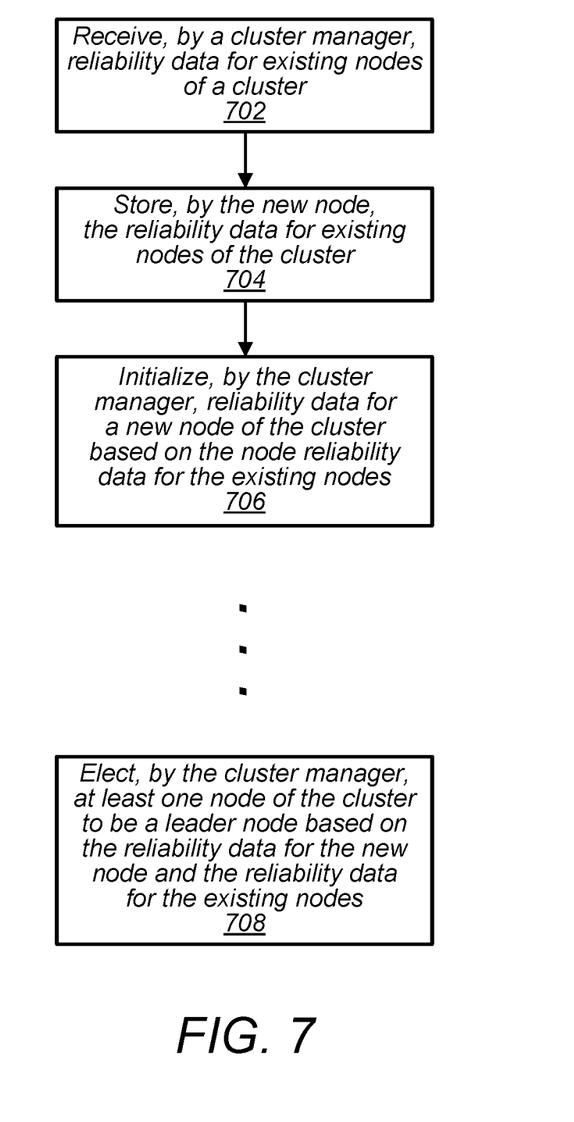
FIG. 7 is a flow diagram illustrating a cluster manager that initializes reliability data for a newly joined node of a cluster, according to some embodiments.

FIG. 7 is a flow diagram illustrating a cluster manager that initializes reliability data for a newly-joined node of a cluster.

At block 702, a cluster manager receives reliability data for one or more existing nodes of a cluster. In some embodiments, the cluster manager may receive the reliability data in the form of periodic heartbeat messages. In embodiments, based on receiving reliability data from an existing node in the form of heartbeat messages over a period of time, the cluster manager may calculate a number of times the exiting node has failed (or has been accused of failing).

At block 704, the cluster manager stores the received reliability data for one or more existing nodes of the cluster. At block 706, the cluster manager initializes reliability data for a new node of the cluster based on the received node reliability of the one or more existing nodes. At a later point in time (block 708), the cluster manager elects one or more nodes of the cluster to be a leader node based on the initialized reliability data for the new node and the reliability data for the existing nodes.

Figure 8:
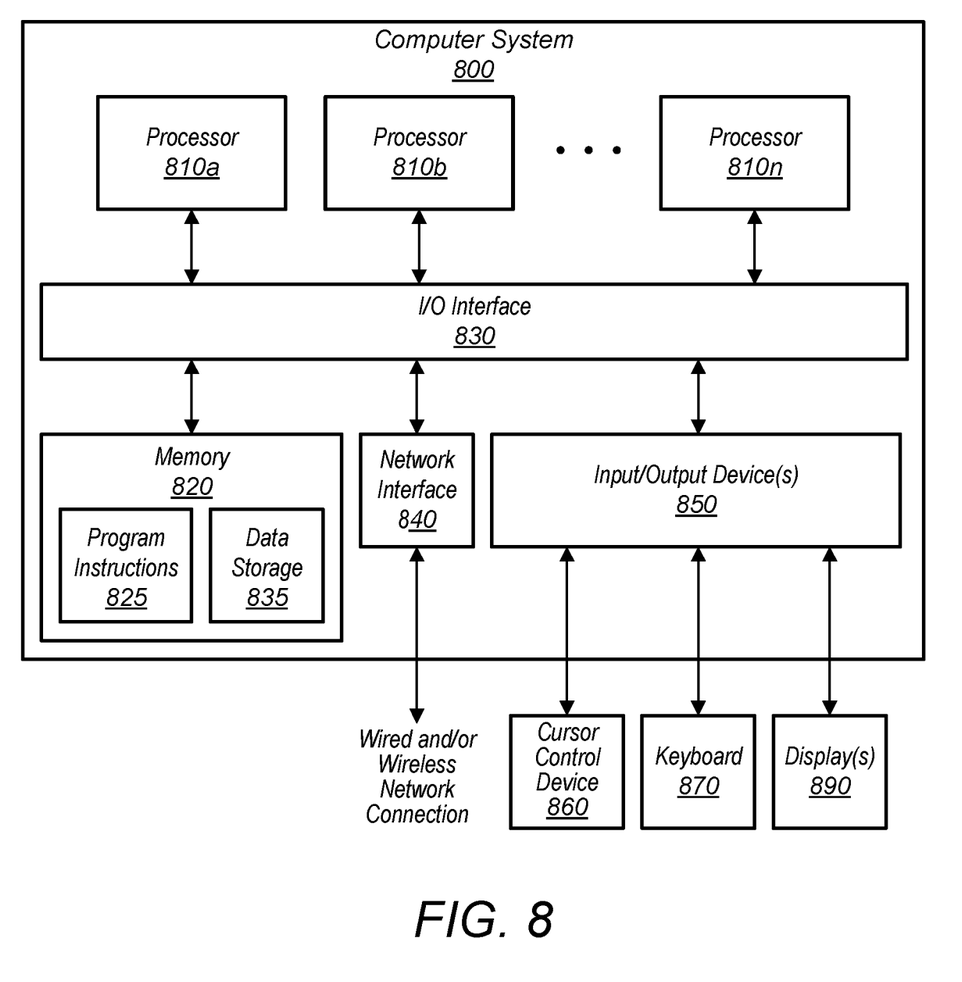
FIG. 8 is a block diagram illustrating an example computer system that implements some or all of the techniques described herein, according to some embodiments.

Any of various computer systems may be configured to implement processes associated with initializing node reliability data for leadership election. For example, FIG. 8 is a block diagram illustrating one embodiment of a computer system suitable for implementing at least some of the systems and methods described herein. In various embodiments, the computing devices or the client networks or computing devices that implement services of the cluster, cluster manager, and/or any other described components may each include one or more computer systems 700 such as that illustrated in FIG. 8 or one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the cluster and cluster manager are shown stored within system memory 820 as program instructions 825. In some embodiments, system memory 820 may include data 835 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between the connected device 100 and other computer systems, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.7, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device 850 (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the computing devices, various services or components of the cluster, cluster manager, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices of a network comprising respective processors and memory to implement a distributed system to:
receive node reliability data for a plurality of existing nodes of a group of nodes of the distributed system, wherein the node reliability data indicates one or more measurements of reliability for respective nodes of the existing nodes;
initialize reliability data for a new node of the group based on the node reliability data for the plurality of existing nodes of the group, wherein the reliability data for the new node indicates one or more measurements of reliability for the new node; and
elect at least one node of the group other than the new node as a leader node based at least in part on the initialized reliability data for the new node and the node reliability data for the one or more existing nodes of the group.

2. The system of claim 1, wherein the new node performs the receiving of the node reliability data for the existing nodes and the initializing of the reliability data of the new node, and wherein to elect the at least one node, the one or more computing devices implement the distributed system to:
vote, by the new node, for the at least one node of the group to be the leader node based at least in part on the reliability data for the new node and the node reliability data for the one or more existing nodes of the group.

3. The system of claim 1, wherein a cluster manager performs the receiving of the node reliability data for the existing nodes and the initializing of the reliability data of the new node, and wherein to elect the at least one node, the one or more computing devices implement the distributed system to:
elect, by the cluster manager, the at least one node of the group as the leader node based at least in part on the reliability data for the new node and the node reliability data for the one or more existing nodes of the group, wherein the cluster manager comprises one or more nodes other than the group of nodes.

4. The system of claim 1, wherein the node reliability data for the one or more existing nodes of the group comprises a number of times respective ones of the existing nodes of the group have been accused of failing, and wherein to initialize the reliability data for the new node, the one or more computing devices implement the distributed system to:
include in the reliability data for the new node a number of times that the new node has been accused of failing, wherein the number of times that the new node has been accused of failing is based at least on the number of times the respective ones of the existing nodes of the group have been accused of failing.

5. The system of claim 4, wherein to initialize the reliability data for the new node, the one or more computing devices implement the distributed system to:
calculate a likelihood for a number of times that existing nodes of the group have been accused of failing based on the number of times the respective ones of the existing nodes of the group have been accused of failing; and
calculate the number of times that the new node has been accused of failing based on the likelihood for the number of times that existing nodes of the group have been accused of failing.

6. A method, comprising:
receiving node reliability data for one or more existing nodes of a group of nodes;
initializing reliability data for a new node of the group based on the node reliability data for the one or more existing nodes of the group; and
electing at least one node of the group other than the new node as a leader node based at least in part on the initialized reliability data for the new node and the node reliability data for the one or more existing nodes of the group.

7. The method of claim 6, further comprising:
receiving, by the new node, the node reliability data for the one or more existing nodes of the group;
initializing, by the new node, the reliability data for the new node of the group; and
voting, by the new node, for the at least one node of the group to be the leader node.

8. The method of claim 6, further comprising:
receiving, by a cluster manager, the node reliability data for the one or more existing nodes of the group, wherein the cluster manager comprises one or more nodes other than the group of nodes;
initializing, by the cluster manager, the reliability data for the new node of the group; and
electing, by the cluster manager, the at least one node of the group as the leader node.

9. The method of claim 6, wherein the node reliability data for the one or more existing nodes of the group comprises a number of times respective ones of the existing nodes of the group have been accused of failing, and wherein initializing the reliability data for the new node comprises:
including in the reliability data for the new node a number of times that the new node has been accused of failing, wherein the number of times that the new node has been accused of failing is based at least on the number of times the respective ones of the existing nodes of the group have been accused of failing.

10. The method of claim 9, wherein initializing the reliability data for the new node further comprises:
calculating a likelihood for a number of times that existing nodes of the group have been accused of failing based on the number of times the respective ones of the existing nodes of the group have been accused of failing; and
calculating the number of times that the new node has been accused of failing based on the likelihood for the number of times that existing nodes of the group have been accused of failing.

11. The method of claim 10, wherein calculating the number of times that the new node has been accused of failing comprises:

calculating the number of times as above the likelihood for the number of times that existing nodes of the group have been accused of failing.

12. The method of claim 6, further comprising:
   measuring one or more performance metrics for the new node; and
   updating the initialized reliability data for the new node based at least on the performance metrics for the new node.

13. The method of claim 6, wherein the new node and the one or more existing nodes comprise a replica group of storage nodes storing replicas of a data object, wherein the at least one leader node is configured to perform writes to the data object, and wherein non-leader nodes of the group are configured to perform read operations for the data object.

14. A non-transitory computer-readable storage medium storing program instructions that, when executed by one or more computing devices of a network, cause the one or more computing devices to implement:
   receiving node reliability data for one or more existing nodes of a group of nodes;
   initializing reliability data for a new node of the group based on the node reliability data for the one or more existing nodes of the group; and
   electing at least one node of the group other than the new node as a leader node based at least in part on the initialized reliability data for the new node and the node reliability data for the one or more existing nodes of the group.

15. The computer-readable storage medium as recited in claim 14, wherein the program instructions cause the one or more computing devices to implement:
   receiving, by the new node, the node reliability data for the one or more existing nodes of the group;
   initializing, by the new node, the reliability data for the new node of the group; and
   voting, by the new node, for the at least one node of the group to be the leader node.

16. The computer-readable storage medium as recited in claim 14, wherein the program instructions cause the one or more computing devices to implement:
   receiving, by a cluster manager, the node reliability data for the one or more existing nodes of the group, wherein the cluster manager comprises one or more nodes other than the group of nodes;
   initializing, by the cluster manager, the reliability data for the new node of the group; and
   electing, by the cluster manager, the at least one node of the group as the leader node.

17. The computer-readable storage medium as recited in claim 14, wherein the node reliability data for the one or more existing nodes of the group comprises a number of times respective ones of the existing nodes of the group have been accused of failing, and wherein to initialize the reliability data for the new node, the program instructions cause the one or more computing devices to implement:
   including in the reliability data for the new node a number of times that the new node has been accused of failing, wherein the number of times that the new node has been accused of failing is based at least on the number of times the respective ones of the existing nodes of the group have been accused of failing.

18. The computer-readable storage medium as recited in claim 17, wherein to initialize the reliability data for the new node, the program instructions cause the one or more computing devices to implement:
   calculating a likelihood for a number of times that existing nodes of the group have been accused of failing based on the number of times the respective ones of the existing nodes of the group have been accused of failing; and
   calculating the number of times that the new node has been accused of failing based on the likelihood for the number of times that existing nodes of the group have been accused of failing.

19. The computer-readable storage medium as recited in claim 18, wherein to calculate the number of times that the new node has been accused of failing, the program instructions cause the one or more computing devices to implement:
   calculating the number of times as above the likelihood for the number of times that existing nodes of the group have been accused of failing.

20. The computer-readable storage medium as recited in claim 14, wherein the program instructions cause the one or more computing devices to implement:
   collecting one or more performance metrics for the new node on a periodic basis; and
   updating the initialized reliability data for the new node based at least on the collected performance metrics for the new node.

* * * * *